INVENTORS:
HARRY E. ENGLESON
ELMER D. SRAMEK

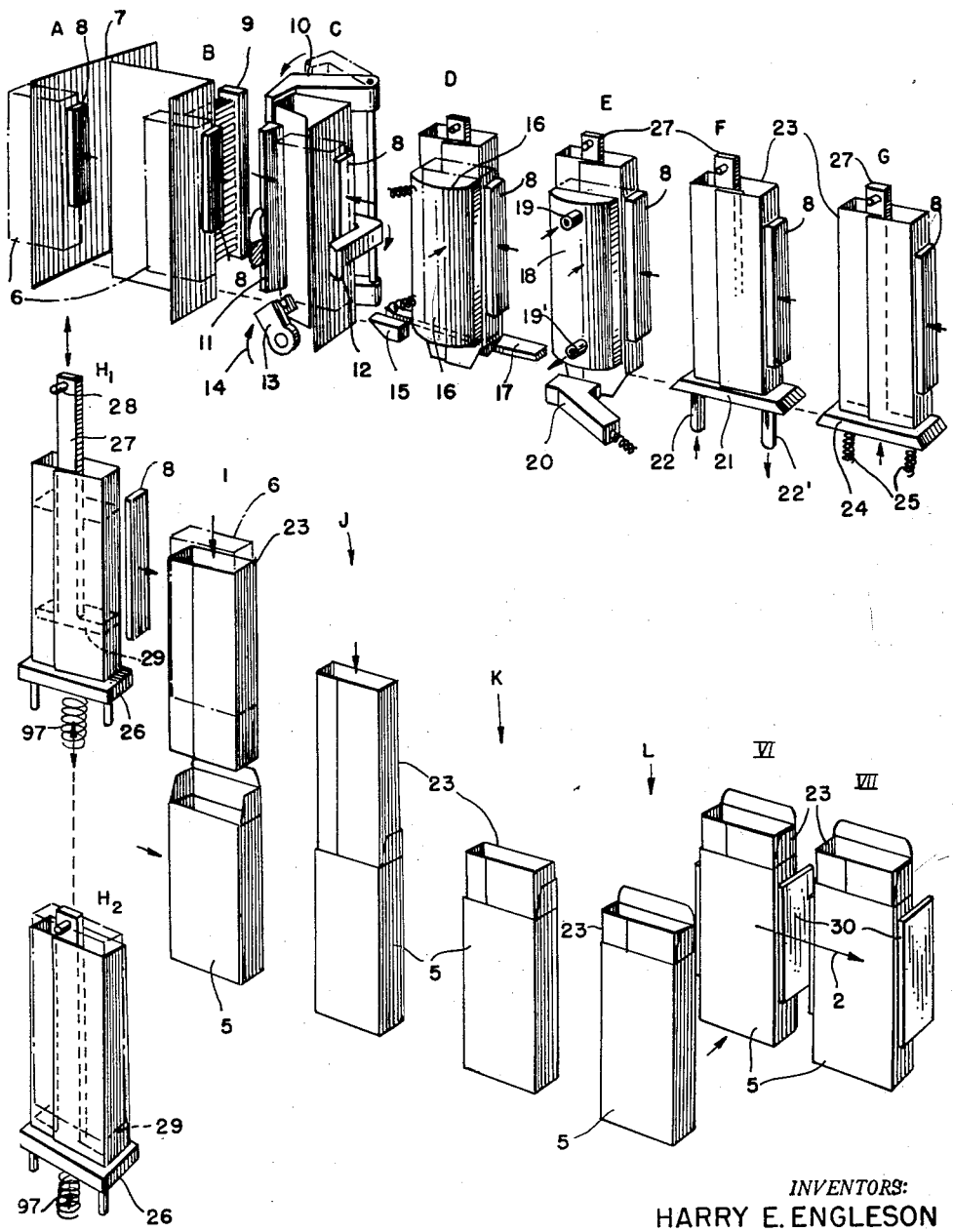

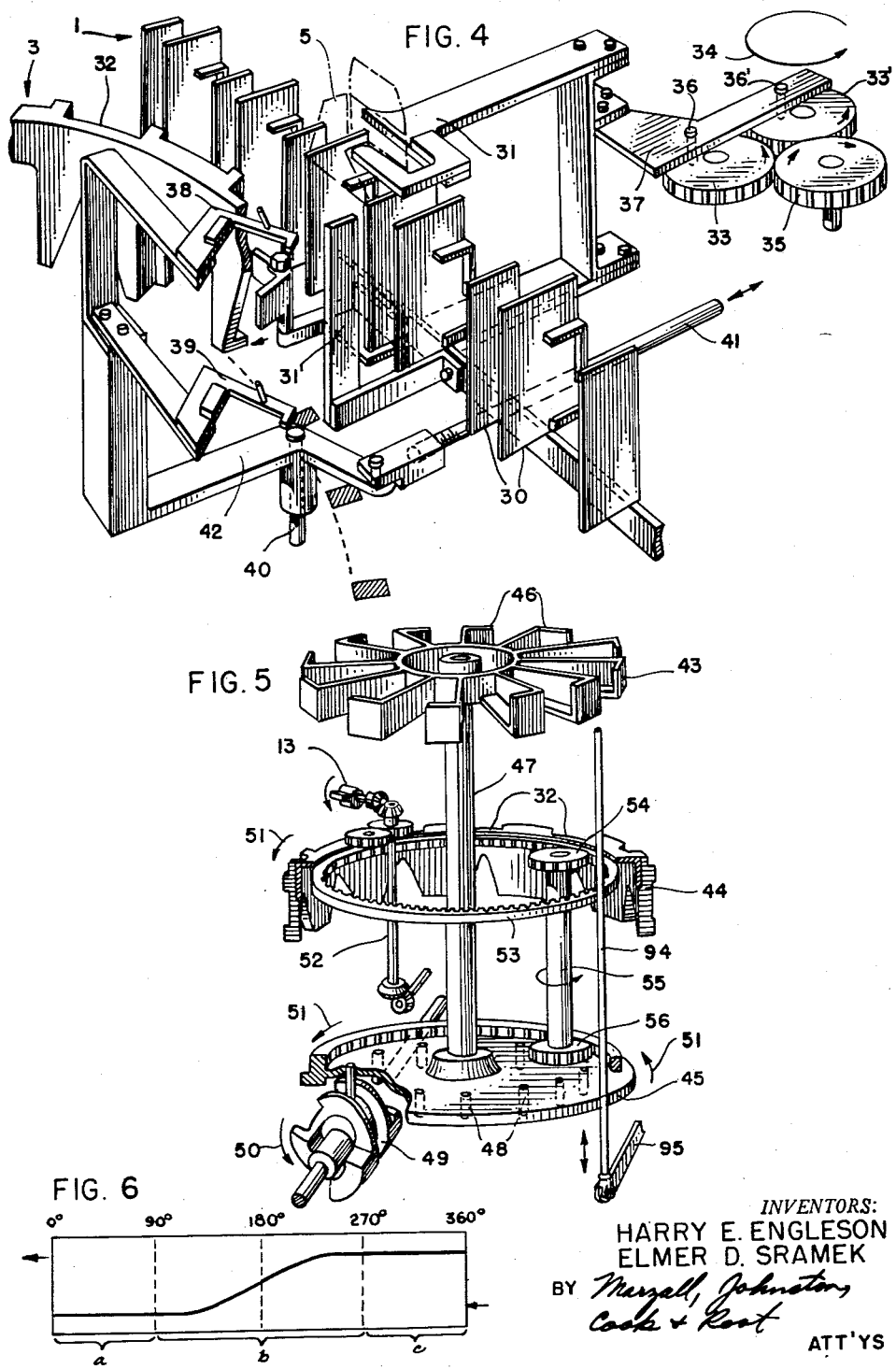

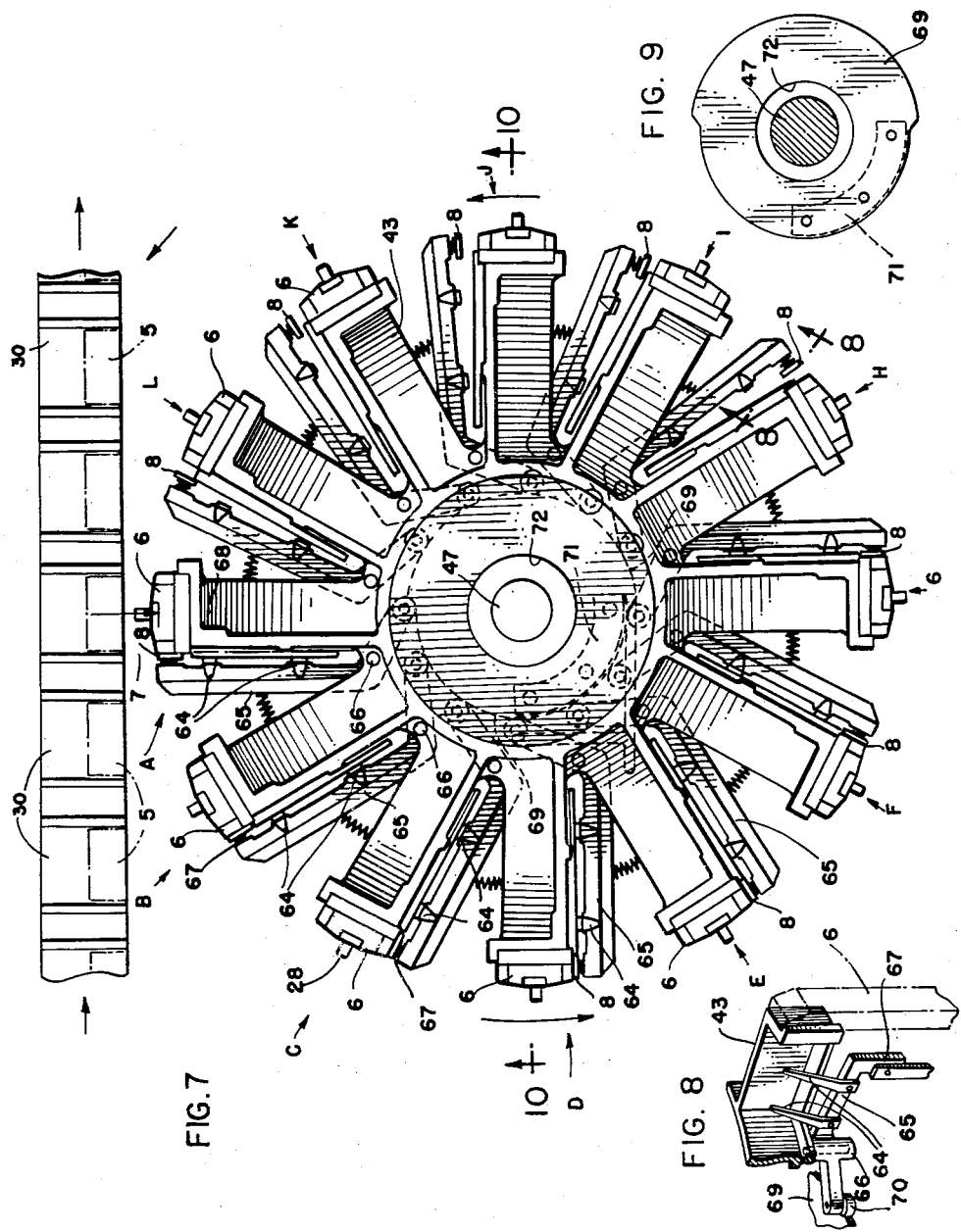

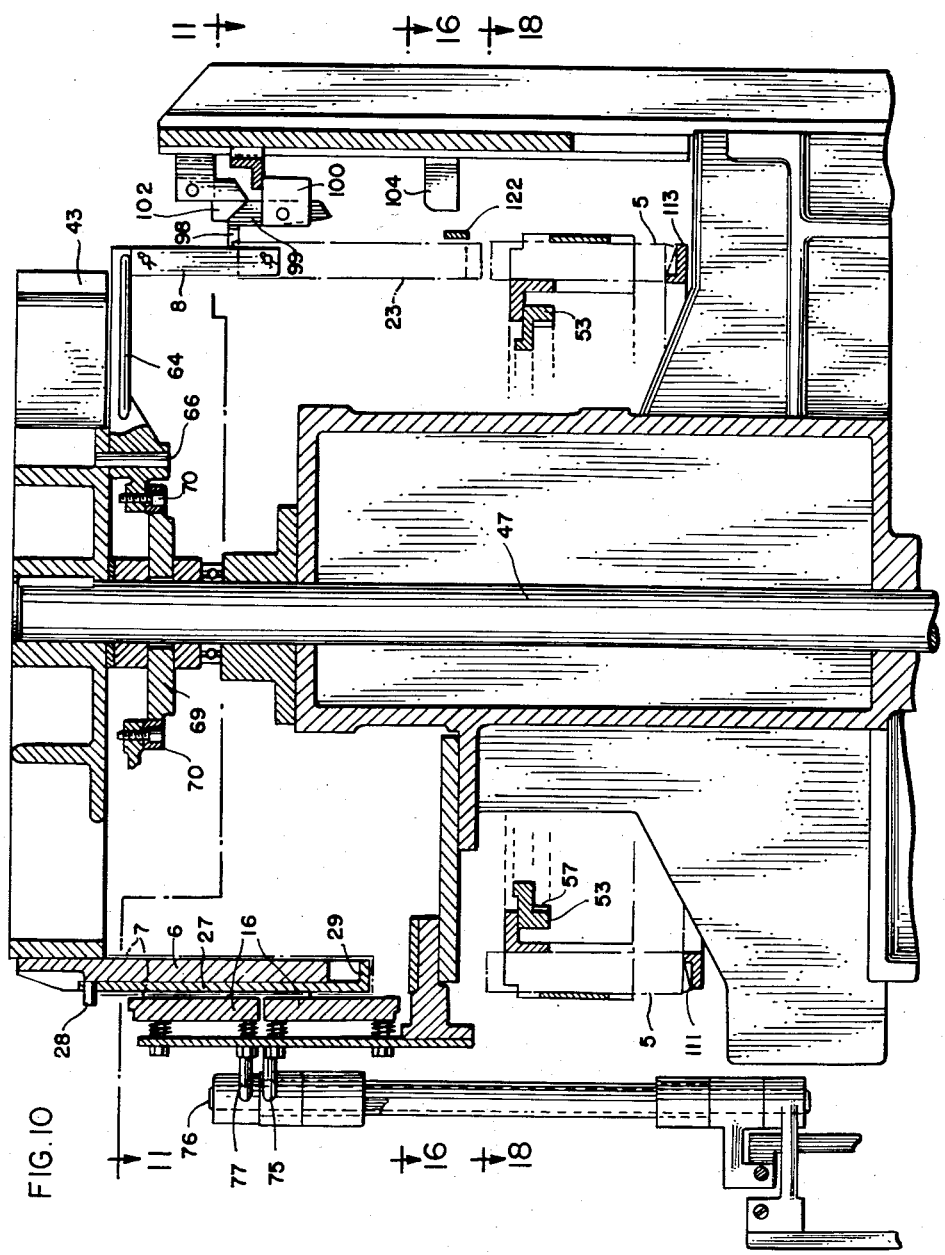

Feb. 14, 1961   H. E. ENGLESON ET AL   2,971,636
ROTARY CONVEYOR STRUCTURE
Original Filed Nov. 28, 1955   10 Sheets-Sheet 6
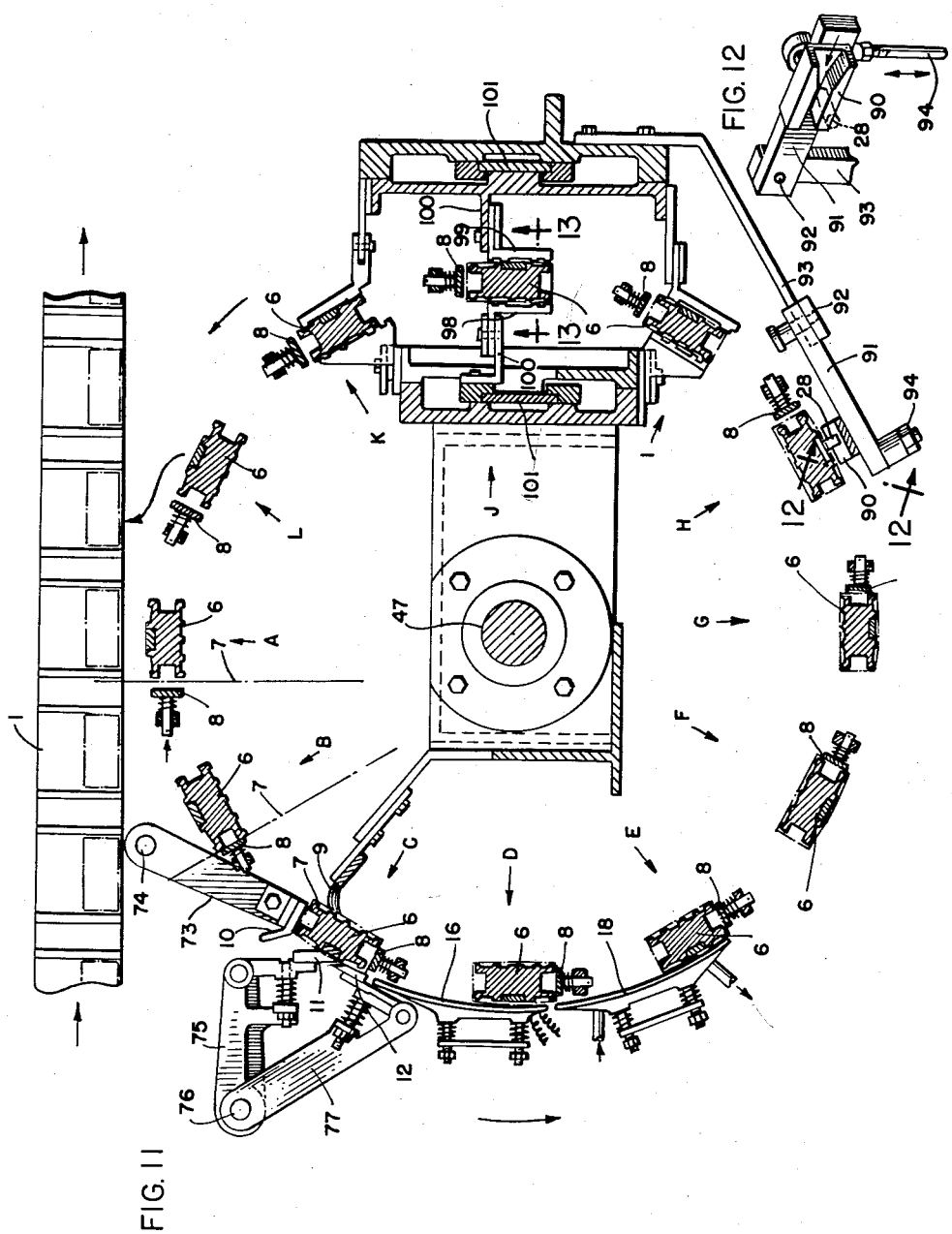
INVENTORS:
HARRY E. ENGLESON
ELMER D. SRAMEK
BY
Marzall, Johnston, Cook & Root
ATT'YS Feb. 14, 1961 H. E. ENGLESON ET AL 2,971,636
ROTARY CONVEYOR STRUCTURE
Original Filed Nov. 28, 1955 10 Sheets-Sheet 7

INVENTORS:
HARRY E. ENGLESON
ELMER D. SRAMEK
BY
*Mazzell, Johnston, Cook + Root*
ATT'YS Feb. 14, 1961   H. E. ENGLESON ET AL   2,971,636
ROTARY CONVEYOR STRUCTURE
Original Filed Nov. 28, 1955   10 Sheets-Sheet 8
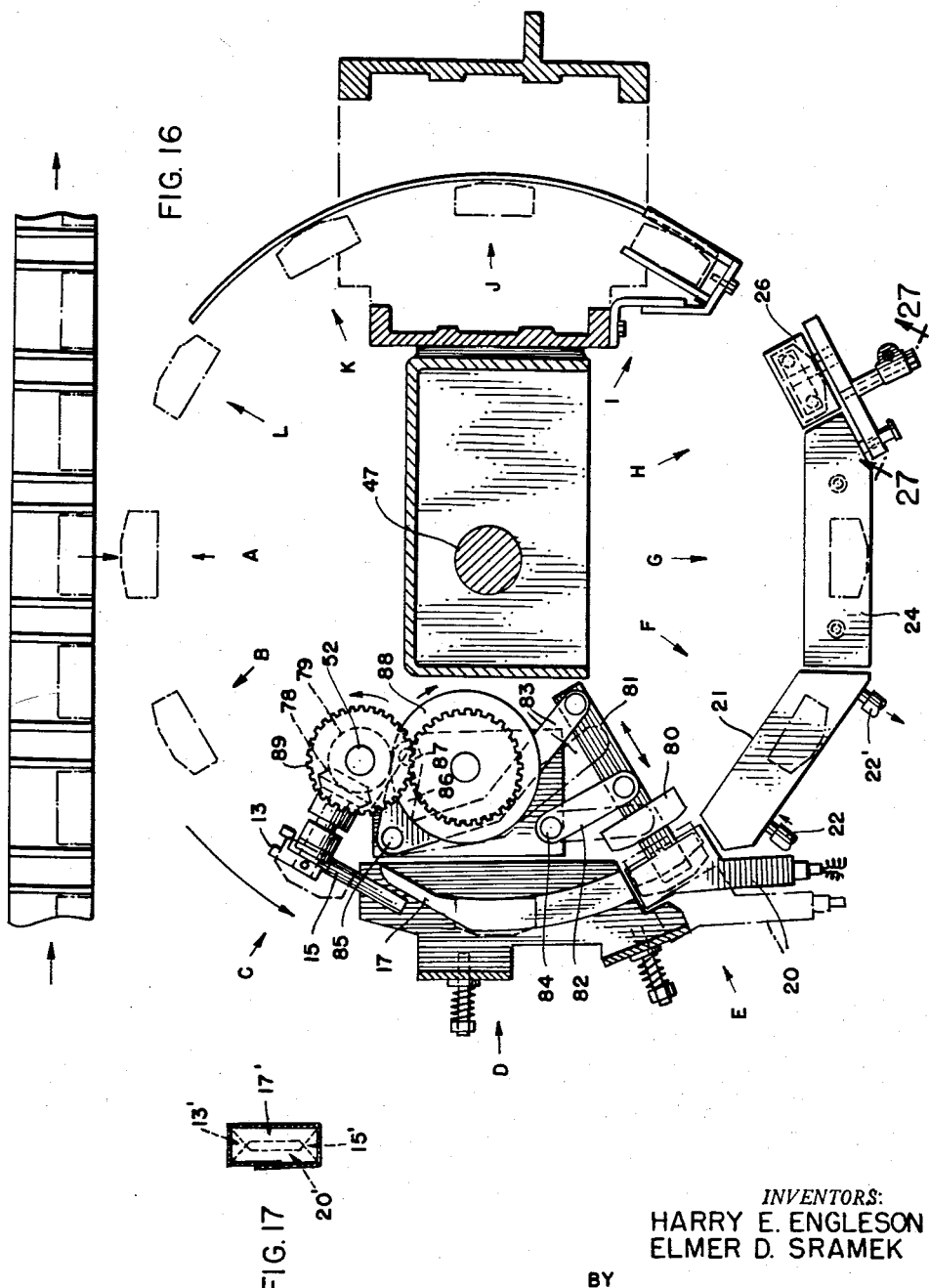
INVENTORS:
HARRY E. ENGLESON
ELMER D. SRAMEK
BY
Marzall, Johnston, Cook & Root
ATT'YS

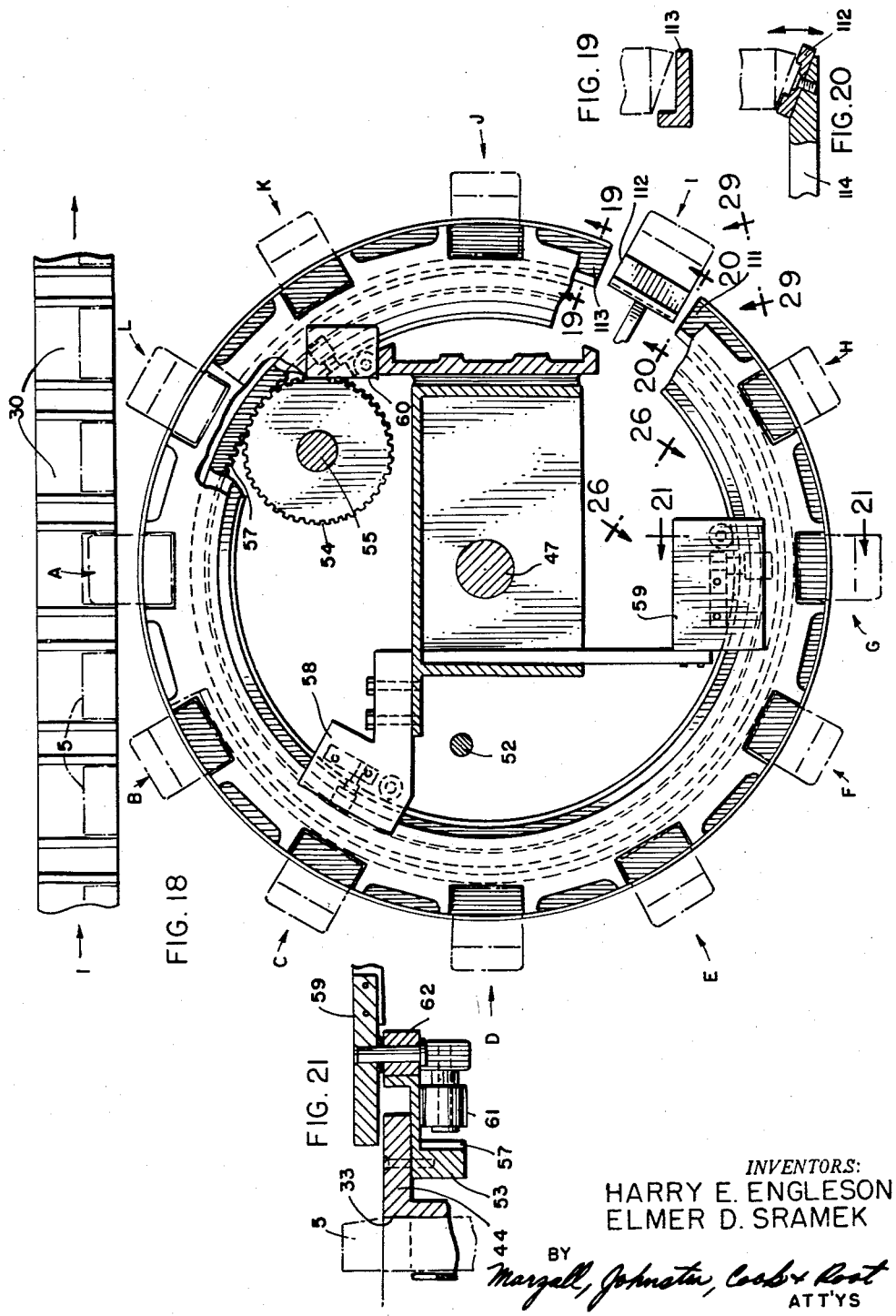

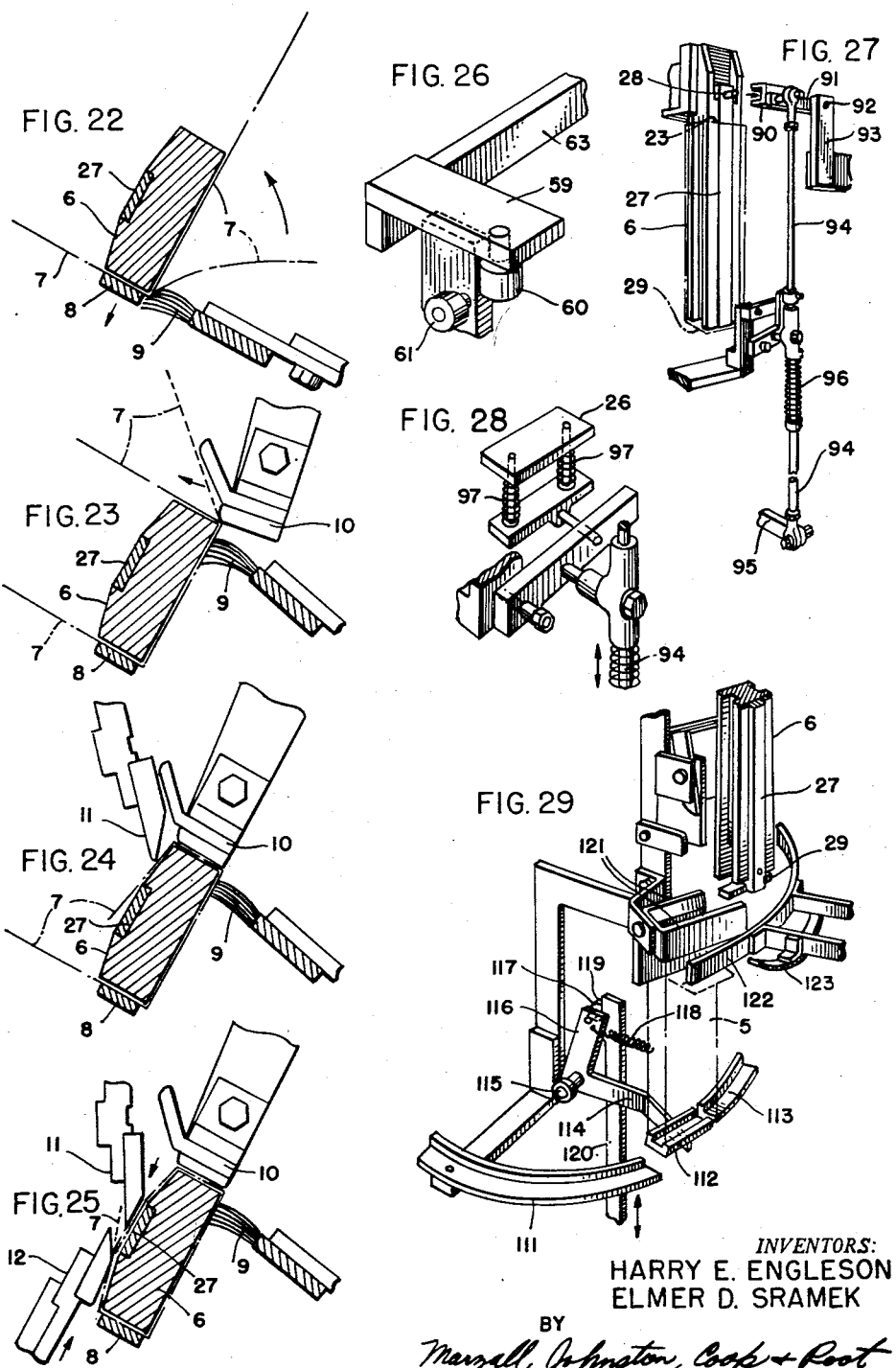

United States Patent Office 2,971,636
Patented Feb. 14, 1961

2,971,636

ROTARY CONVEYOR STRUCTURE

Harry E. Engleson, Chicago, and Elmer D. Sramek, Cicero, Ill., assignors to F. B. Redington Co., Chicago, Ill., a corporation of Delaware Original application Nov. 28, 1955, Ser. No. 549,380. Divided and this application Dec. 29, 1958, Ser. No. 783,257

8 Claims. (Cl. 198—209)

This invention relates to packaging machines, and more particularly to apparatus associated with a conveyer for forming bag containers and for inserting them into cardboard cartons.

It is an object of this invention to provide an improved method and apparatus for receiving sheets of bag forming material by folding the material around a rectilinear form mounted on a conveyer and then heating and chilling the material at places of overlap to bond the seams to form a bag container, the formed bag container being broken free of the form, the bag being stripped from the form and finally inserted into a cardboard carton which is carried on the conveyer.

A further object of this invention is to provide an improved method for mechanically forming a bag container wherein a sheet of wax impregnated material is held in a clamped position, folded about a form and is overlapped in a vertical seam on the face of the form; the overlapped seam thence being heated, chilled, and broken free from the form.

Another object of this invention is to provide apparatus for forming bags and inserting them into cardboard cartons; the bags being substantially rectangular with wide front and rear faces and with comparatively narrow side faces; each bag to be formed with a vertical overlapped seam on its front face thereby providing a double thickness of material to reinforce the front face and stiffen the bag generally; such double thickness of material on a face functioning to stiffen the bag even though the seam should be defectively bonded and thereby permitting even the defectively formed bags to be stripped from the form and inserted into a carton to avoid jamming of the machine.

Another object of this invention is to provide an improved form having a substantially rectilinear body for forming bag containers, said form having an insert strip slidably mounted along a front face and having a foot plate positioned across the bottom and movable with the insert strip; said insert strip being adapted to move relative to the body of the form and thereby to break a formed bag container free from the form.

A further object is to provide an improved circular conveyer having a wheel structure for supporting conveyer attachments and having a ring structure mounted to rotate about the same axis as the wheel structure; the ring structure having other conveyer attachments and being geared to rotate at the same speed and in synchronism with the wheel structure, thereby permitting the attachments on the wheel structure to cooperate with the attachments on the ring structure and whereby other apparatus may extend through the ring structure of the conveyer without interfering with the rotation thereof.

A more complete understanding of the present invention, its mode of operation and its advantages may be gathered from further reading of this specification together with an inspection of the accompanying drawings, in which:

Fig. 3 is a schematic diagram of the steps in the forming of a bag container on the intermittently moving conveyer;

Fig. 4 is a fragmentary perspective view of a portion of a continuously moving straight conveyer, a portion of an intermittently moving circular conveyer, and the mechanism for transferring cardboard cartons from one conveyer into the other;

Fig. 5 is a perspective view of the circular conveyer particularly illustrating the wheel structure and ring structure thereof and the driving mechanism;

Fig. 6 is a graphical representation showing a deveolpment of the cam for driving the conveyer with intermittent motion;

Fig. 7 is a top view of the circular conveyer together with a portion of the straight conveyer and illustrating particularly the guide and clamp attachments for guiding sheets of material to a position beside the rectilinear forms and for clamping them in that position;

Fig. 8 is a fragmentary perspective view along the plane 8—8 of Fig. 7, particularly illustrating the guide and clamp mechanism;

Fig. 9 is a top view of a stationary cam positioned within the circular conveyer to operate the clamp members;

Fig. 10 is a vertical section of the circular conveyer along the plane 10—10 of Fig. 7;

Fig. 11 is a horizontal section of the circular conveyer along the plane 11—11 of Fig. 10 and particularly illustrating the various rectilinear forms positioned thereon;

Fig. 12 is a fragmentary perspective view along the plane 12—12 of Fig. 11 and particularly illustrating the mechanism for engaging and moving a strip insert along the front face of the rectilinear forms;

Fig. 16 is a horizontal section along the plane 16—16 of Fig. 10 and particularly illustrating the mechanism for folding the bottom of the bag container and for heating and chilling the bottom to bond the bag.

Fig. 17 is a horizontal sectional view of a bag container illustrating the manner of folding thereof as is accomplished by the apparatus of this invention;

Fig. 18 is a horizontal section along the plane 18—18 of Fig. 10 illustrating structure for supporting and for driving the ring structure of the circular conveyer;

Fig. 19 is a vertical section along the plane 19—19 of Fig. 18 showing only the stationary rail upon which the cardboard cartons rest;

Fig. 20 is a vertical section along the plane 20—20 of Fig. 18 and showing only a portion of a movable member for raising the cardboard cartons from a first supporting rail to a second rail at a higher level;

Fig. 21 is a vertical section along the plane 21—21 of Fig. 18 showing a typical support bracket for the rotatable ring forming a lower part of a circular conveyer;

Figs. 22, 23, 24, and 25 are schematic diagrams illustrating in progression the successive steps of forming a bag container about a rectilinear form;

Fig. 26 is a fragmentary perspective view along the plane 26—26 of Fig. 18 illustrating a supporting bracket upon which the circular ring rotates;

Fig. 27 is a fragmentary perspective view along the plane 27—27 of Fig. 16 illustrating particularly the mechanism for engaging and operating the insert slide and the foot plate of the rectilinear form;

Fig. 28 is an enlarged detail of a part of Fig. 27; and

Fig. 29 is a fragmentary perspective view taken along the plane 29—29 of Fig. 18 and illustrating the mechanism for raising the cardboard cartons from the first supporting rail to the second rail, a rectilinear form moving on the conveyer, and members for guiding bag containers as they are stripped from the forms and lowered into the cartons.

Figure 1:
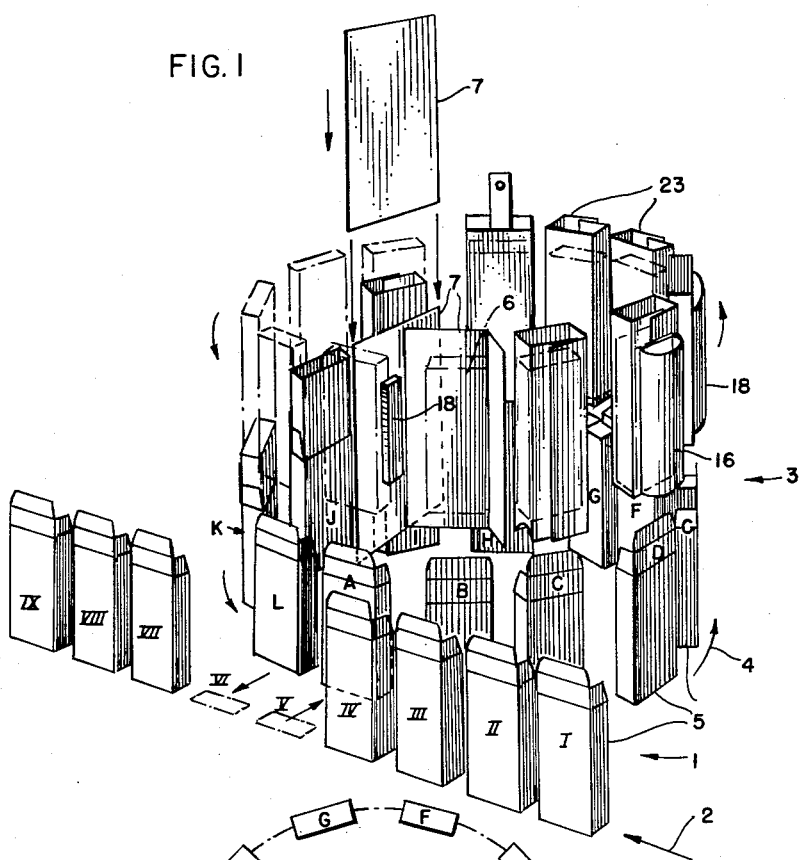
Fig. 1 is a schematic representation illustrating in progression the successive steps in which a bag container is formed and thence inserted into a cardboard carton.
Figure 2:
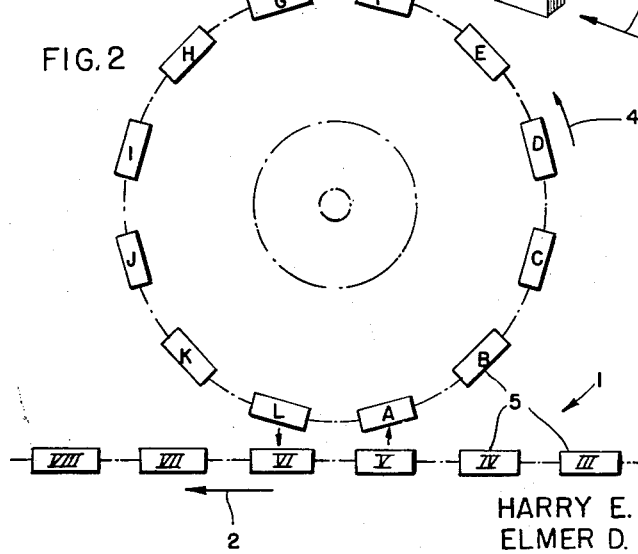
Fig. 2 is a schematic diagram showing the various positions of the cardboard cartons as they move along a continuously moving straight conveyer, are transferred to and move around an intermittently moving circular conveyer, and are returned to the straight conveyer.

The particular packaging machine illustrated by the drawings comprises a first conveyer 1 which moves continuously along a single direction as indicated by the arrow 2 (Figs. 1 and 2); and a circular conveyer 3 which moves intermittently in a direction indicated by the arrows 4. A plurality of cardboard cartons 5 are initially carried by the continuously moving conveyer and move through the positions indicated by I–V (Figs. 1 and 2); and thence are transferred by a mechanism, to be described later, to the circular conveyer 3. The conveyor 3 moves each carton in steps through all of the stations A through L; and thence another transfer mechanism, to be described later, moves the carton from station L on the circular conveyer 3 to the position VI on the conveyer 1 from which the carton continues to move to the left (Figs. 1 and 2). The circular conveyer 3 receives sheets of wax impregnated material, forms therefrom bag containers, and inserts them into the cartons where they constitute inner liners. When the cartons are returned to the conveyer 1 at position VI (Figs. 1 and 2), each carton contains a bag liner formed and sealed at the bottom and along the face thereof but open at the top for filling. Subsequently the conveyer 1 carries the cartons to stations where they are to be filled; the bag liner is thence folded closed, and the carton is closed.

*Bag forming operation*

The method by which a bag container is formed and inserted into a cardboard carton may be understood by referring to Fig. 3 which shows schematically the various positions around the circular conveyer 3. The circular conveyer 3 supports twelve forms 6 which are substantially rectilinear in shape and each of which moves sequentially through all of the stations or positions A through L. Fig. 3 is a development in which the various circular conveyer stations are shown perspectively in a straight line, stations H through L being a continuation of the line of stations A through G.

In station A a sheet of wax impregnated material 7 is guided into a position adjacent to the leading side of the form 6 and a clamp member 8 moves against the waxed material 7, holding it secure against the form 6. In station B the form 6 moves past a brush 9 which is mounted in a fixed position adjacent to and inside of the circular conveyer 3. The brush folds the bag forming material 7 flat against the rear face of the rectilinear form 6 as the form moves past the position of the brush. When the form 6 moves to station C, a side folding member 10 folds the material 7 outwardly along the trailing side of the form 6 from the rear face thereof; thence a pair of front folding members 11 and 12 move across the front face of the form and fold the bag forming material 7 and overlap it in a vertical seam along the front face.

The method by which the material is folded and overlapped around the forms might be better understood by referring to Figs. 22, 23, 24, and 25. In Fig. 22, a sheet of material 7 is clamped against the leading side of the form 6 which is moving past the stationary brush 9. In Fig. 23 the material 7 has been wiped across the rear face of the form 6 by the brush 9, and as the form 6 dwells in station C (Fig. 2), the side folding member 10 moves outwardly wiping the material across the trailing side of the form. Fig. 24 shows the side folding member 10 at the end of its outward movement, and the first front folding member 11 moving and folding the material 7 across the front of the form 6 from the trailing side thereof. In Fig. 25, the second front folding member 12 moves and folds the material across the front from the leading side of the form 6.

Both of the front folding members 11 and 12 are wedge-shaped to permit cooperation therebetween such that the material will be overlapped along a vertical seam overlying a slide insert strip 27 in the front face of the form 6, the operation of which will be described later. As illustrated in Figs. 22, 23, 24, and 25, the form 6 may be generally of rectilinear cross section, but having that part of the front face including the insert strip 27 thickened and protruding somewhat. The vertical seam overlies the thickened portion and is, therefore, in a position exposed for subsequent heating and chilling operations.

Referring again to Fig. 3 for further description of the steps of bag forming, it will be noted that the bag material is wrapped about the sides and faces of the form in stations B and C. Also in station C, a rotatably mounted bottom tucking member 13 turns forwardly across the bottom of the form as indicated by the arrow 14, and makes a fold from the trailing side thereof. As the form 6 then moves from station C to station D, the lower portion of the bag forming material 7 is engaged by a stationary bag tucking member mounted such that the bottom of the form moves in close proximity to it. When the form arrives at station D, it is encased by the bag forming material on the four faces and sides, and the bottom is folded inwardly from both the leading and trailing sides. A heating element 16, mounted closely adjacent to the conveyor at station D, heats the overlapped seam on the front face of the form and softens the wax therein. A bottom flap folding member 17 is mounted in a fixed position and has a diagonal edge which engages the rearmost bottom flap and folds it forwardly as the form moves over the diagonal edge thereof.

A chilling plate 18 is positioned adjacent to the conveyer at station E such that it will come in contact and chill the front face and harden the wax of the bag forming material. The chilling plate 18 has connections 19 and 19' which are adapted to be connected for the flow of a cooling fluid, such as water, to remove heat and provide a flat chilling surface adjacent to the vertical form.

A bottom heating element 20 moves from the front to the rear at the bottom of the form at station F, and performs a dual function of making a bottom fold rearwardly from the front face and heating the folded and overlapped material, softening the wax therein at the bottom of the form. A second chilling plate 21 is positioned beneath the conveyer at station G and the bottom of the formed bag container is chilled thereby to bond the softened wax. Connections 22 and 22' are provided to admit and expel the cooling fluid for removal of heat. Thus, by successive steps from stations A to F, a sheet of bag forming material 7 has been formed into a bag 23 appearing on the form at station F.

*Break-free operation*

As the form moves to position G, a cold metal plate 24 is urged upwardly by springs 25 against the bottom of the bag. A second spring loaded base plate 26 is positioned to press upwardly against the bag form as it comes into position H. The plates 24 and 26 hold the bottom of the bag 23 firmly as the wax in the bag forming material hardens and the plate 26 further supports the bag as it is broken free from the form 6. In position H an insert strip 27 is operated for the purpose of breaking the formed bag free from the form, and this operation is accomplished in two steps as is shown schematically in Fig. 3 as $H_1$ and $H_2$, both of which operations occur when the form 6 and bag 23 dwell in station H between the intermittent movements of the conveyor 3.

The insert strip 27 is slidably mounted in and extends vertically along the face of the form 6 (Fig. 3). A stud 28 extends outwardly therefrom for engagement with the break-free mechanism to be described later. A foot plate 29 is attached to and movable with the insert strip 27. At the beginning of the break-free operations, as shown at $H_1$ in Fig. 3, the clamp 8 moves away from the form 6 to release the side of the bag 23, and the strip insert 27 with the attached foot part 29 moves upwardly. By this upward movement, the vertical seam of the bag container is broken free from the insert strip 27 on the front face of the form 6 and simultaneously the bottom folds are likewise broken free from the foot plate 29. Subsequently, but during the same interval of conveyor dwell, at $H_2$ in Fig. 3, the insert strip is moved downwardly such that the foot part 29 descends to an extreme downward position clamping against the spring loaded bottom plate 26 and pulling the bag container free from the remaining parts of the form 6.

*Stripping operation*

The operation of removing or stripping the bag container 23 from the rectilinear form 6 and inserting it into a cardboard carton 5 is accomplished in successive steps at stations I, J and K. In station I the cardboard carton 5, positioned under the bag 23, is raised slightly, and the bag 23 is lowered somewhat and guided into the carton 5. In stations J and K the bag container is lowered in successive steps such that the bag container 23 is ultimately positioned within the cardboard carton 5 with the upper ends open for filling. The cardboard carton 5, containing the bag container 23, is then transferred to position VI on the continuously moving conveyor 1 which then carries the carton and the bag away to the right through position VII, as is indicated by the direction arrow 2 (Fig. 3).

*Transfer mechanism*

Fig. 4 illustrates the mechanism for transferring the cardboard cartons 5 from the continuously moving straight conveyor 1 to the circular, intermittently moving conveyor 3 and vice versa. The conveyor 1 contains a plurality of buckets 30 or special holders adapted to receive and carry the cardboard cartons 5. As a carton 5 is carried along the conveyor 1, it is intercepted by a transfer member having an arm 31 adapted to receive and hold the top flaps of the cardboard carton. As the top of the carton 5 is received by the intercept member 31, a pusher member 31' engages the bottom of the carton. The two members 31 and 31' then move in a direction transverse to the conveyor 1 (to the left in Fig. 4), and the carton is then seated in a pocket 32 of the circular conveyor 3. Movement of the members 31 and 31' is accomplished through linkage to a pair of gears 33 and 33', both of which turn with the same speed of rotation and in the direction indicated by the arrow 34. Power is applied to the gears 33 and 33' from a common drive gear 35 which may be mechanically coupled to a main drive shaft (not shown) of the machine. The gears 33 and 33' each have an upstanding stud member 36 and 36' mounted to drive a member 37 with a reciprocating motion while maintaining the member 37 parallel to its initial position which is transverse with the movement of the conveyor 1. The member 37 is rigidly connected to the carton intercepting members 31 and 31' such that the parallel reciprocating motion is imparted thereto.

A second transfer mechanism, also illustrated in Fig. 4, is adapted to receive the cartons from the final station of the circular conveyor 3 and to move them into the buckets 30 of the conveyor 1. A pair of carton receiving members 38 and 39 are positioned to receive and hold the carton at the top and bottom thereof. The carton holders 38 and 39 then move about a pivot 40 as a push-pull link 41 moves a bell crank member 42. Any carton within the holder is thereby carried to a position within a bucket 30 of the conveyor 1. Both transfer mechanisms shown in Fig. 4 are coupled by conventional means to the main drive shaft (not shown) of the packaging machine and, therefore, the gear 35 and the push-pull link 41 operate in synchronism with both the conveyer 1 and the conveyer 3.

*Circular conveyer and drive mechanism*

The general structure and the means for driving the circular conveyer with an intermittent motion is illustrated in Fig. 5. The circular conveyer comprises generally an upper mounting structure 43 wherein the bag containers are formed, an intermediate structure 44 on which the cardboard cartons 5 are carried, and a lower driving wheel 45. The upper structure 43 is essentially a wheel and contains twelve arms 46, each being an angle iron with an end plate adapted to support a rectilinear form such that the form will hang downwardly therefrom and have its faces, sides and bottom free from supporting attachments. The upper wheel structure 43 of the circular conveyer 3 is mounted and supported by a vertical shaft 47 and is driven directly from the lower drive wheel 45. The lower drive wheel 45 has downwardly extending studs 48 which are engageable with a worm cam 49. As the drive worm 49 is rotated, as indicated by the direction arrow 50, successive pins 48 are engaged thereby rotating the lower drive ring in the direction of the arrows 51. The drive worm 49 contains a helical drive portion extending around less than half of the circular arc of the worm. As the drive worm 49 rotates through the remainder of its arc, the drive wheel 45 remains in a stationary position.

Fig. 6 represents graphically a development of the drive worm 49 and illustrates the manner in which the conveyer 3 will move as the drive worm 49 is rotated through 360°. Since the first portion $a$ of the development curve is flat, the conveyer 3 dwells in a stationary position as the drive worm 49 rotates through the first 90° of arc. From the second portion $b$ of the curve of Fig. 6, it may be seen that as the drive worm 49 continues to rotate from the 90° point to the 180° point, the conveyer is accelerated, and as the drive worm 49 continues to rotate from the 180° point to the 270° point, the conveyer is decelerated. The curve at $c$ is flat, and, therefore, the conveyer 3 will dwell as the drive worm 49 rotates from the 270° point to the 360° point, and thence to the 90° point of the next succeeding revolution.

Since the function of the circular conveyer is to form bag containers and thence to insert them into cartons held at a lower level, it is necessary that the conveyer have the upper supporting structure 43 for holding the rectilinear forms 6 and further have the carton holding structure 44 positioned substantially below the structure 43. A vertical shaft 52 is needed to drive a bottom tucker member 13 to make a fold in the bottom of the bag container 23, and since this vertical shaft is most conveniently positioned to extend upward through the intermediate structure 44 of the conveyer 3, it is obvious that the structure 44 cannot be a wheel with spokes or such extending inwardly to the shaft 47.

A circular ring 53, having internal teeth 57 thereon, is driven by a gear 54 mounted on a vertical shaft 55 and, in turn, driven from the bottom drive structure 45 by means of another gear 56. The gears 54 and 56 are of the same size and have the same number of teeth such that circular ring 53 will turn at the same speed and in synchronism with the lower drive wheel 45 and the upper part of the conveyer 43.

The supporting structure for the center conveyer ring 44 may be seen in Figs. 18 and 21. In Fig. 18, which is a horizontal section through the circular conveyer, the relation between the internal teeth 57 and the drive gear 54 is illustrated, and the ring structure 44 rests at three points about the circumference thereof on roller brackets 58, 59 and 60. The structure of the bracket 59, which is typical of the three, is detailed in the vertical section of Fig. 21. The roller support bracket 59 is arranged with a support roller 61 mounted to rotate about a horizontal axis and positioned to support the ring structure 44 which rests thereon. A second roller 62 is rotatably mounted on a vertical axis and serves as a guide, engaging the ring structure 44 to hold the ring structure in a proper rotatable position. The ring structure 44 which contains the internal gear 57 also provides a mounting for the conveyer attachments such as the pockets 32 for receiving cardboard cartons 5.

The roller support bracket 59 is shown in perspective in Fig. 26. The bracket 59 is therein shown attached to a fixed stationary mounting 63 and having thereon the support roller 61 and the guide roller 62. The combination of the three roller support points 58, 59 and 60 (Fig. 18) provides the intermediate ring structure 44 with a stable, rotatable mounting; and the driving arrangement for the ring structure permits the various parts of the circular conveyer 3 to rotate as a unit. Therefore, the conveyer attachments on the ring structure 44 may move in a cooperative relation with the attachments on the wheel structure 43, and the center within the ring structure 44 is free from supporting spokes or the like, permitting the center space to be utilized by mechanisms such as the bottom tucket drive shaft 52.

*Bag forming apparatus*

The first of the bag forming operations is the receiving of sheets 7 of wax impregnated paper, or metal foil having layers of wax impregnated paper on one side thereof; and the guiding of these sheets 7 into a position adjacent to the rectilinear forms 6. The apparatus for receiving the sheets of bag forming material is illustrated in Figs. 7 and 8. A sheet 7 of material, which has previously been cut from a roll of such material, moves downwardly from a position above the upper wheel structure 43 of the conveyer 3 and is guided by paper guides 64 into a position occupied by the sheet 7 shown in the upper part of Fig. 7. The paper guides 64 (see Fig. 8) are mounted on a horizontal arm 65 which is pivoted about a vertical axis at 66 on the conveyer 3. The clamp member 8 is mounted on the paper guide structure 65 with springs 67 such that when the horizontal arm 64 is pivoted the clamp member 8 comes into firm engagement with the leading side of the rectilinear form 6. The paper guide members 64 serve their function as they are moved by the conveyer 3 through a plane indicated by the dashed line 68 at the top of Fig. 7. At that point a sheet of material 7 drops and is guided by the guide members 64. The horizontal arm 65 constitutes one arm of the bell crank pivoted at the point 66 on the conveyor and moved by a stationary cam 69 as the other arm of the bell crank carrying a cam roller 70 engages the cam.

Fig. 9 illustrates the specific cam 69 which is mounted in a stationary position by a bracket 71. The vertical shaft 47 supporting the wheel structure 43 extends through an opening 72 in the cam 69 and does not engage the cam.

The cam 69 operates the clamp 8 as the conveyer 3 rotates such that the clamp will close and hold the sheet of materials 7 as the rectilinear form 6 moves through all of the stations B through G (Fig. 2) which appear on the left side of Fig. 7. The clamp 8 opens, releasing the formed bag 23, after the form 6 has progressed to the station H shown at the lower right side of Fig. 7.

Fig. 11 is a horizontal section of the conveyor 3 showing the forms 6 in section and showing some of the apparatus for forming the bag containers 23 according to the previously described method. The operation of the clamp 8 is best illustrated in Fig. 11 where it may be seen in an open position at station A for receiving a sheet of material 7; and clamped in station B and clamped in the subsequent stations through G; and thence in an open position in station H and the remaining stations.

In station C the forms 6 move into operative relation with the brush 9, the side folding member 10, and the front folding members 11 and 12; and Fig. 11 illustrates the positioning of these folding elements with relation to the conveyer and to each other. The brush 10 is mounted in a fixed position on the frame of the machine. The side folding member 10 is mounted on an arm 73 and pivoted about a point 74. The horizontal arm 73 is positioned at a level substantially lower than the form 6 such that there will be no interference therebetween. The side folding member 10 extends upward from the horizontal arm 73 such that it may move in close proximity across the trailing side of the form 6 as the form dwells in position C. The front folding member 11 is held by an arm 75 and pivoted about a point 76, and moves forwardly across the face of the form 6. Thence a second front folding member 12 mounted on an arm 77 and likewise pivoted at the point 76, moves rearwardly across the front face of the form 6.

Fig. 11 further illustrates the positioning of the heating plate 16 and the chilling plate 18 with respect to the conveyer 3 and the forms 6 mounted thereon. As has previously been discussed, the heating and chilling plates 16 and 18 function to soften and thence to harden and bond the wax in the overlapped seam on the front face of bag container 23. Because this seam is overlapped on the exposed front face of the form, the heating and chilling devices may be mounted in a stationary position and may extend over more than one station of the conveyer 3 to remain in operative contact with the bag forming material for as long a time as may be required. This proves to be advantageous over other heating and chilling devices that must complete their operating cycle during a single interval of dwell of the conveyer.

As has previously been discussed, the bottom of the bag container is tucked, folded and bonded by heating and chilling operations; the structure of the bottom folding members and the heating and chilling plates 20 and 21 is best illustrated in Fig. 16. The first step in tucking and folding the bottom of the bag container is accomplished by the rotating bottom tucking member 13 which folds the material forwardly across the bottom from the trailing side. The bottom tucking member 13 is rotated and driven by a pair of pinion gears 78 and 79 and driven from the vertical shaft 52. The bottom tucking member 13 folds the material into a tuck 13' (see Fig. 17) across the bottom of the bag container. The second bottom tucking member 15 remains stationary in a position below the conveyer 3 and engages the material from the leading side of the form 6, folding it inwardly across the bottom as the form moves on the conveyer. The bottom tucking member 15 folds the tuck 15' as shown in Fig. 17. The bottom flap folding member 17 is fixed in a stationary position below the conveyer and has a diagonal edge that engages the rearward bottom flap, moving it forwardly across the bottom as the form 6 moves over the member 17. In Fig. 17 the flap 17' was folded forwardly from the rear by the bottom folding member 17.

As the form 6 moves into position E (see Fig. 16), a platform member 80 at the level of the bottom of the form is positioned immediately below the form and retains the three previous folds 13', 15' and 17' in a position flat against the bottom of the form. While the form 6 dwells in position E, a supporting member 81 moves rearwardly carrying with it the platform member 80 and the bottom heating element 20. As the heating element 20 moves rearwardly across the bottom of the form, the last fold 20' is made upon the bag container and thence all of the overlapped portions at the bottom of the bag are heated by the heating element 20 to soften the wax therein. The supporting member 81 which carries the platform 80 and the heating plate 20 moves with a reciprocating motion and is supported by a pair of pivotal arms 82 and 83 pivotally mounted at points 84 and 85 respectively on a stationary part of the machine. The arm 83 constitutes one leg of a bell crank which has a second leg 86 supporting a cam roller 87. The cam roller 87 is mounted to extend upwardly into a cam groove cut into the underside of a gear member 88. A gear 89, secured to the shaft 52, drives the gear and cam member 88, thereby reciprocating the bell crank 83—86, the member 81, and the platform 80 and heater plate 20.

Fig. 16 also shows the positioning of the bottom water-cooled chilling plate 21 as well as the spring-loaded cooling plates 24 and 26.

As previously mentioned, the rectilinear form 6 is supported by the upper wheel structure 43 and extends downwardly therefrom. The form is substantially rectilinear, although the various sides and faces thereof are not flat but may contain grooved depressions. As may be seen from the cross sections of the form illustrated in Fig. 11, the front and rear faces contain ribs and grooves which facilitate the stripping operation to be discussed later. The leading and trailing sides may each contain a deep and extensive groove which serves to effect an economy of manufacture and to reduce the weight thereof by eliminating excess metal. The various grooves further serve to decrease the surface area which will come into contact with the waxed material in the process of bag forming. Since the heating and chilling of the bag seams causes the wax to soften and to bond the seams together, and further causes the waxed material to bond to the form itself, it is desirable to limit the area of contact between the form and the material and to thereby reduce the bonding effect between the form and the bag container 23. The form 6 is also provided with the insert strip 27 extending vertically along the front face thereof (see Fig. 27). The insert strip 27 and a foot plate 29 at the bottom of the form are attached together as a single unit and are adapted to slide upwardly and downwardly within the body of the form 6. The bottom of the form with the foot plate extending downward therefrom may be seen in Fig. 29.

*Break-free apparatus*

The operation of breaking the formed bag free from the form is accomplished by moving the insert strip 27 together with the foot plate, first upwardly and then downwardly from the normal position of rest within the form. The means for providing such movement is illustrated in Fig. 27 which shows in perspective a single form moving to a position whereby the stud 28, protruding from the insert strip 27, is about to go into operative engagement with a movable slideway 90. The movable slideway (see Fig. 12) contains upper and lower guide members in spaced relation, forming a horizontal open ended slot therebetween. The slideway 90 is mounted on an arm 91 to pivot about a point 92, the pivot 92 being held fixed by stationary structure 93 constituting a part of the frame of the machine. A link member 94 is attached to the arm 91 and is thus adapted to move the slideway 90 both upwardly and downwardly. The lower extremity of the link 94 (see Figs. 5 and 27) is pivotally connected to an arm 95 which may be coupled by means of cams, etc. to the main drive shaft (not shown) of the packaging machine and will, therefore, move in synchronism with the movements of the conveyer 3 and with the forms 6 thereon.

As the form 6 moves into station H for the break-free operation, the stud 28 moves into the slideway 90 and the bottom of the form is positioned over a movable base plate 26 (see Figs. 27 and 28). As the slideway is raised, raising the insert strip 27 and the foot plate 29 of the form, the base plate 26 is likewise urged upward against the bottom of the form and held by the force of a spring 96 (Fig. 27) or alternatively by springs 97 (Fig. 28). Thus, the bottom of the bag container 23 is clamped and secured to the bottom corners of the form 6 to prevent the bag from tearing as the foot plate of the form recedes upwardly between the corner portions thereof. In the subsequent downward movement of the link 94, whereby the insert strip and foot part are lowered to an extreme position, the base plate 26 descends to a lower level permitting the bag container 23 to descend slightly on the form as it is broken free thereof.

*Stripper apparatus*

Figure 13:
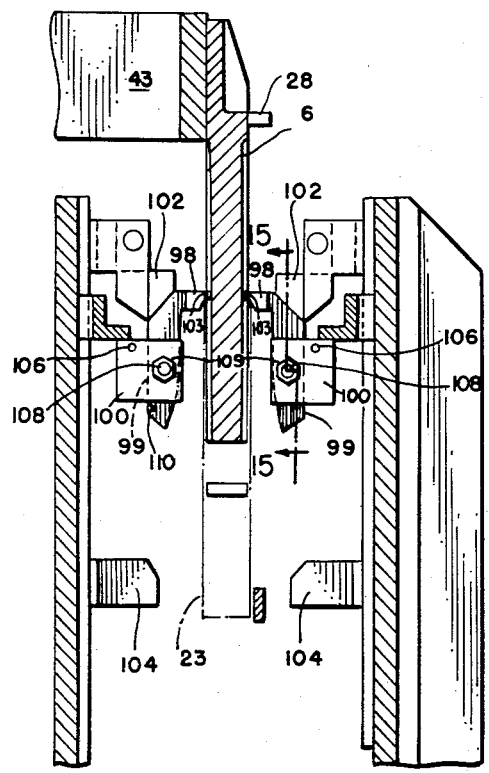
Fig. 13 is a vertical section along the plane 13—13 of Fig. 11 and illustrating the mechanism for stripping the bag container from the rectilinear form and for inserting the bag container into a cardboard carton.
Figure 14:
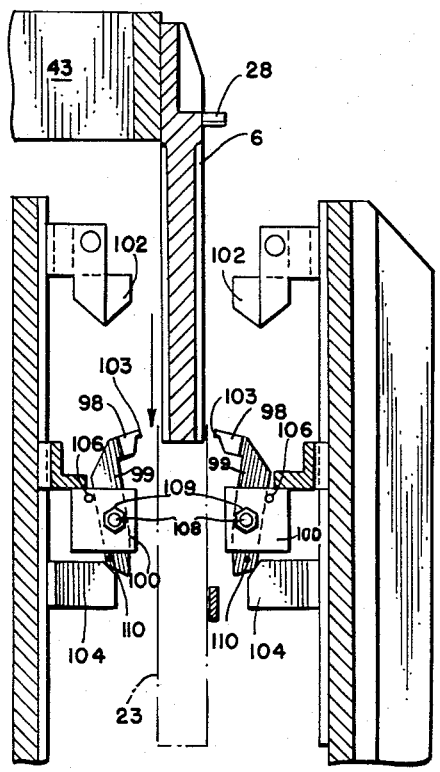
Fig. 14 is a vertical section similar to Fig. 13 and illustrating the stripper mechanism in a lowered position.
Figure 15:
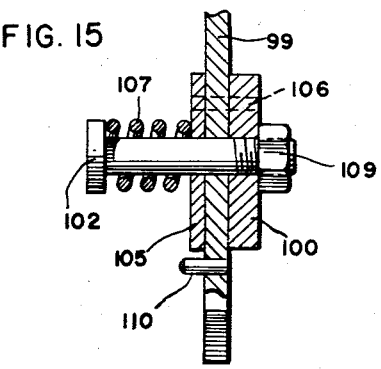
Fig. 15 is an enlarged vertical section along the broken line 15—15 of Fig. 13 and illustrating the pivotal mounting of the stripper fingers.

After the formed bag container 23 has been broken free from the form 6 (see Fig. 11), it is carried by the form into three subsequent stations I, J and K, where the bag is stripped downwardly off of the form 6 and inserted into the cardboard carton 5 positioned thereunder. In each of the stripper stations, a plurality of stripper fingers 98 engage the top edge of the formed bag 23 from the front and rear faces of the form 6 and pull the bag downwardly. The stripper finger apparatus is illustrated in Figs. 13, 14 and 15, which show particularly the action of the second or intermediate set of strippers at station J. These particular strippers are typical of all three stations and are the only ones to be shown and described in detail herein.

The stripper fingers 98 are formed integral with vertical supporting shanks 99 which are pivotally mounted on support brackets 100 (Figs. 13 and 14). The support brackets 100 are mounted upon slide members 101 (see Fig. 11) and adapted to move upwardly and downwardly carrying all of the stripper assemblies therewith. Each set of stripper fingers has associated therewith a stationary member or upper tilt cam 102 positioned to engage the vertical shank 99 of the stripper fingers and to pivot the shank and fingers thereon inwardly when the slides 101 and support brackets 100 raise to an extreme upper position (Fig. 13). When the fingers 98 are pivoted inwardly, they are positioned to engage the upper edge of the bag container 23 with hooked ends 103 and to hold the bag 23 downwardly as the stripper fingers are lowered in the next sequence of operations. A second set of stationary members or lower tilt cams 104 are positioned to engage the stripper finger assemblies at an extreme downwardly position and to tilt the stripper assemblies outwardly, disengaging them from the bag container 23 (Fig. 14). The stripper assemblies are then in a position to be moved upwardly for a new cycle of operation.

The stripper fingers 98 and the vertical supporting shanks 99 thereof are pivotally mounted on and are frictionally engaged with the supporting bracket 100. Since they are in a frictional engagement they will remain in the tilt position as shown in Fig. 14 after engagement with the lower tilt cams 104 until they reach the upper extremity of their movement, engaging the upper tilt cams 102 and being returned to their original pivotal position.

Fig. 15 illustrates the frictional mounting of the stripper fingers of this invention. A plate 105 is maintained in a fixed position relative to the supporting bracket 100 by a pin 106. The shank 99 of the stripper member is sandwiched between and frictionally engaged with the members 100 and 105. A compression spring 107 is mounted on a bolt 108 and thereby exerts a force increasing the friction applied against the shank 99. The amount of friction between the shank 99 and the members 100 and 105 is adjustable by tightening a nut 106 on the spring bolt 108. The pin 106, extending through the members 100 and 105, serves as a stop to limit the pivotal motion of the fingers 98 in one direction (see Fig. 14). A pin 110, extending through the shank 99 of the stripper fingers, provides a second stop for limiting the pivotal motion in the other direction (see Fig. 13).

The packaging machine, particularly illustrated in the accompanying drawings, is adapted for use with a rather long cardboard carton and consequently a long bag container to be inserted therein. Because of the length of the bag container, it has been found that the stripping operation can best be performed in a plurality of steps. As may be seen from Fig. 11, three sets of stripper fingers and accompanying apparatus permit the stripping operation to be performed at three successive stations on the conveyer as the form 6 and the cardboard carton 5 rest between the intermittent movements.

The operation of inserting a bag 23 into a carton 5 is accomplished principally by the action of the strippers 98 in the three stations I, J and K as previously described; but this insertion of the bag is started at station I by raising the carton upwardly somewhat into a position for receiving the bag. As the carton is moved around the conveyer 3 from station A through station H, it rests on a stationary rail 111 (see Figs. 10 and 18). At station I, the carton 5 moves onto a movable rail section 112 which lifts the carton during the conveyer dwell interval. When the conveyer moves following the dwell interval, the carton 5 moves from station I onto a second support rail 113 positioned at a higher level.

The operation of the carton lifting mechanism is best illustrated in Fig. 29. The movable rail section, or carton lifter 112 is supported by an arm 114 which is pivoted on a stationary part of the machine frame at a point 115. The arm 114 constitutes one leg of a bell crank having a second leg 116 supporting a cam roller 117. A spring 118 urges the arm 116 to the right (Fig. 29) against a cam surface 119 on a vertically reciprocating bar 120. The reciprocating movement of the cam bar 120 causes the bell crank 114, 116 to rock between two predetermined positions and causes the movable rail 112 to move between the level of the first rail 111 and the level of the second rail 113.

In station I the carton 5 is lifted and the bag container 23 is lowered, thereby commencing the operation of inserting the bag into the carton. A U-shaped guide member 121 is positioned at station I (see Fig. 29) to guide the bag 23 as it is lowered to assure that it is started properly into the carton 5. In the actual operation of the packaging machine the form 6 would be positioned directly above the carton 5; but for the sake of clarity in showing the various parts in Fig. 29, the form 6 appears slightly to the right of the carton 5.

During the insertion operation, the flaps of the carton must be held open to avoid interference with the bag liner 23. A pair of guide rails 122 and 123 engage and depress the carton flaps as the cartons move on the conveyer 3. Thus, the carton 5 is held open for reception of the bag 23 therein.

The apparatus of this invention forms a bag container with a seam overlapped and extending vertically along the front face thereof. As has been previously mentioned, this arrangement is advantageous because of the simplicity of the heating and the chilling devices used therewith and because the heating and the chilling operations need not be completed during single intervals of conveyer dwell, but may extend over as long an interval as may be necessary regardless of the conveyer speeds and durations of the dwell intervals between the intermittent conveyer movements.

An additional advantage in forming a bag container with a vertical seam running along the front face resides in the fact that a double thickness of liner material in that seam gives greater strength to the formed bag and decreases the likelihood that the bag will be torn in the break-free operations and in the stripping operations. A further advantage resides in the fact that should the vertical seam be sealed in a defective manner, the bag liner will still maintain sufficient stiffness to permit it to be stripped away from the form and inserted into the cardboard carton, even though defective. Therefore, a defectively formed bag is not as likely to jam the machine, necessitating a shutdown.

This application is a division of our copending application Serial No. 549,380, filed November 28, 1955, entitled "Bag Forming and Inserting Mechanism."

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A circular conveyer comprising an upper wheel structure for mounting conveyer attachments, a vertical shaft attached to and supporting the upper wheel structure, a lower wheel structure attached to the shaft at a level below the upper wheel structure, drive means coupled to the lower wheel structure for rotating the lower wheel structure, the shaft and the upper wheel structure, a circular ring structure positioned at a level intermediate between the upper wheel structure and the lower wheel structure, and gear means mechanically coupled between the ring structure and the lower wheel structure, said ring structure having conveyer attachments positioned in spaced relation for cooperation with the attachments on the upper wheel structure.

2. A circular conveyer comprising an upper wheel structure for mounting conveyer attachments, a first vertical shaft attached to and supporting the upper wheel structure, a lower wheel structure attached to the first shaft at a level below the upper wheel structure, drive means coupled to the lower wheel structure for rotating the conveyer, a circular ring structure positioned at a level intermediate between the upper wheel structure and the lower wheel structure, said lower wheel structure and said ring structure each having internal teeth, a second vertical shaft positioned inside of the conveyer, a first gear secured to the second shaft and engaging the teeth on the lower wheel structure, and a second gear secured to the second shaft and engaging the teeth on the ring structure, said gears and said second vertical shaft being operable to rotate the ring structure at the same speed and in synchronism with the upper wheel structure.

3. A circular conveyer comprising an upper wheel structure for circumferentially supporting packaging machine elements, a central vertical shaft extending downwardly from said upper wheel structure for rotatably supporting same and corotating therewith, a lower wheel structure secured to said shaft and spaced downwardly from said upper wheel structure, means for driving said wheels step-by-step, a ring member rotatably supported intermediate said upper and lower wheel structures for circumferentially supporting other packaging machine elements, and coupling means between one of said wheel structures and said ring member for driving same in synchronism.

4. A circular conveyer comprising an upper wheel structure for circumferentially supporting packaging machine elements, a central vertical shaft extending downwardly from said upper wheel structure for rotatably supporting same and corotating therewith, a lower wheel structure secured to said shaft and spaced downwardly from said upper wheel structure, means for driving said wheels step-by-step, a ring member rotatably supported intermediate said upper and lower wheel structures for circumferentially supporting other packaging machine elements, said elements on said upper wheel structure being vertically aligned with the elements on the ring member, and coupling means between one of said wheel structures and said ring member for driving same in synchronism.

5. A circular conveyer comprising an upper wheel structure for circumferentially supporting packaging machine elements, a central vertical shaft extending downwardly from said upper wheel structure for rotatably supporting same and corotating therewith, a lower wheel structure secured to said shaft and spaced downwardly from said upper wheel structure, means drivingly connected to said lower wheel structure for driving same step-by-step, a ring member rotatably supported intermediate said upper and lower wheel structures for circumferentially supporting other packaging machine elements, and coupling means between one of said wheel structures and said ring member for driving same in synchronism.

6. A circular conveyor comprising an upper wheel structure for circumferentially supporting packaging machine elements, a central vertical shaft extending downwardly from said upper wheel structure for rotatably supporting same and corotating therewith, a lower wheel structure secured to said shaft and spaced downwardly from said upper wheel structure, means drivingly connected to said lower wheel structure for driving same step-by-step, a ring member rotatably supported intermediate said upper and lower wheel structures for circumferentially supporting other packaging machine elements, said elements on said upper wheel structure being vertically aligned with the elements on the ring member, and coupling means between one of said wheel structures and said ring member for driving same in synchronism.

7. A circular conveyor comprising an upper wheel structure for circumferentially supporting packaging machine elements, a central vertical shaft extending downwardly from said upper wheel structure for rotatably supporting same and corotating therewith, a lower wheel structure secured to said shaft and spaced downwardly from said upper wheel structure, means for driving said wheels step-by-step, said driving means including a plurality of equally and circumferentially spaced studs carried by said lower wheel structure and a rotatably driven worm cam engaging successive pins, a ring member rotatably supported intermediate said upper and lower wheel structures for circumferentially supporting other packaging machine elements, and coupling means between one of said wheel structures and said ring member for driving same in synchronism.

8. A circular conveyor comprising an upper wheel structure for circumferentially supporting packaging machine elements, a central vertical shaft extending downwardly from said upper wheel structure for rotatably supporting same and corotating therewith, a lower wheel structure secured to said shaft and spaced downwardly from said upper wheel structure, means for driving said wheels step-by-step, a ring member positioned intermediate said upper and lower wheel structures for circumferentially supporting other packaging machine elements, rollers for rotatably supporting said ring member for rotation about an axis coincident with said vertical shaft and wheel structures, and coupling means between said lower wheel structure and said ring member for driving said ring member and upper wheel structure in synchronism.

References Cited in the file of this patent

UNITED STATES PATENTS

| | | |
|---|---|---|
| 1,104,425 | Keast | July 21, 1914 |
| 2,395,803 | Bruckner et al. | Mar. 5, 1946 |
| 2,727,666 | Bryceland | Dec. 20, 1955 |